(12) United States Patent
Deel et al.

(10) Patent No.: US 9,634,306 B2
(45) Date of Patent: Apr. 25, 2017

(54) BATTERY TRAY AND COVER FOR UNDERGROUND MINING EQUIPMENT

(71) Applicant: Joy MM Delaware, Inc., Wilmington, DE (US)

(72) Inventors: Ray Deel, Abingdon, VA (US); William Jubeck, Seneca, PA (US); Anthony Faccio, Oil City, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 913 days.

(21) Appl. No.: 13/788,047

(22) Filed: Mar. 7, 2013

(65) Prior Publication Data

US 2013/0236760 A1 Sep. 12, 2013

Related U.S. Application Data

(63) Continuation-in-part of application No. 13/440,232, filed on Apr. 5, 2012.

(60) Provisional application No. 61/609,807, filed on Mar. 12, 2012.

(51) Int. Cl.
*H01M 2/10* (2006.01)
*E21F 13/02* (2006.01)

(52) U.S. Cl.
CPC ......... *H01M 2/1077* (2013.01); *E21F 13/025* (2013.01); *H01M 2/1083* (2013.01)

(58) Field of Classification Search
None
See application file for complete search history.

(56) References Cited

U.S. PATENT DOCUMENTS

| 1,424,144 | A | 7/1922 | Kunkel |
|---|---|---|---|
| 2,886,622 | A | 5/1959 | Shannon |
| 5,278,002 | A | 1/1994 | Hiers |
| 6,593,027 | B1 | 7/2003 | Osterhart et al. |
| 7,350,610 | B2 | 4/2008 | Kikuchi |
| 7,572,550 | B2 | 8/2009 | Saito et al. |
| 2004/0191615 | A1 | 9/2004 | Johnson et al. |
| 2006/0061309 | A1 | 3/2006 | Rudinec |
| 2007/0122696 | A1 | 5/2007 | Richter et al. |

FOREIGN PATENT DOCUMENTS

| CA | 1148213 A1 | | 6/1983 |
|---|---|---|---|
| CN | 2601463 | * | 1/2004 |

OTHER PUBLICATIONS

Patent Examination Report from the Australian Intellectual Property Office for Australian Application No. 2013201341 dated Mar. 24, 2014 (4 pages).
First Office Action from The State Intellectual Property Office of the People's Republic of China for Chinese Application No. 201420197884.X dated Jun. 11, 2014 (5 pages).

(Continued)

*Primary Examiner* — Sarah A Slifka
(74) *Attorney, Agent, or Firm* — Michael Best & Friedrich LLP (57) ABSTRACT

A battery-powered mining machine comprising a battery tray and a plurality of batteries. The battery tray including at least one battery partition, the battery partition made entirely of plastic. The plurality of batteries in the battery tray to provide power to the mining machine, the plurality of batteries held in place by the battery partition.

14 Claims, 8 Drawing Sheets

(56) References Cited

OTHER PUBLICATIONS

Second Office Action with English translation from the State Intellectual Property Office of the People's Republic of China for Application No. 201310077765.0 dated Dec. 28, 2016 (14 pages).

* cited by examiner

BATTERY TRAY AND COVER FOR UNDERGROUND MINING EQUIPMENT

RELATED APPLICATION

This application is a continuation-in-part of co-pending U.S. Utility patent application Ser. No. 13/440,232 filed on Apr. 5, 2012, which claims priority to U.S. Provisional Patent Application No. 61/609,807 filed on Mar. 12, 2012, the entire contents of all of which are incorporated herein by reference.

BACKGROUND

The present invention relates to a plastic battery tray and cover for use in connection with underground mining equipment, specifically battery-powered haulers. Traditional underground mining equipment battery trays and covers are made of steel or fiberglass. The strength of the steel protects the battery from falling debris, which is encountered in underground mines.

SUMMARY

Traditional steel battery trays have several problems associated with them. Since steel is conductive and subject to corrosion, it must be coated with a non-conducting, non-flammable, and non-corrosive coating in order to meet Mine Safety and Health Administration (MSHA) requirements. The coating process is expensive and not completely effective since the available coatings deteriorate with time and the battery tray must eventually be stripped and recoated. In addition, the traditional steel battery tray is heavy, weighing approximately 5185 lb, resulting in a total weight of 23,750 lb when the batteries are placed within the battery tray. This weight increases the time and effort required to service the battery. The additional weight of the traditional steel battery tray also increases the load of underground mining machine components and increases the amount of energy used by the machine. While fiberglass battery trays are lightweight, the fibers of the fiberglass battery tray covers have a potential to wick and retain acid from the batteries. Once a fiberglass battery tray retains acid from the batteries it becomes conductive.

In one embodiment, the invention provides a battery-powered mining machine comprising a battery tray and a plurality of batteries. The battery tray including at least one battery partition, the battery partition made entirely of plastic. The plurality of batteries in the battery tray provide power to the mining machine, and are held in place by the battery partition.

In another embodiment, the invention provides a battery tray enclosing one or more batteries and being mounted to a chassis of a battery-powered mining machine. The battery tray comprises at least one battery partition. The battery partition includes spacers and is made entirely of plastic.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Also, although directional references, such as upper, lower, downward, upward, rearward, bottom, front, rear, etc., may be made herein in describing the drawings, these references are made relative to the drawings (as normally viewed) for convenience. These directions are not intended to be taken literally or limit the present invention in any form. In addition, terms such as "first," "second," and "third" are used herein for purposes of description and are not intended to indicate or imply relative importance, significance, or ordering unless otherwise indicated.

Figure 1:
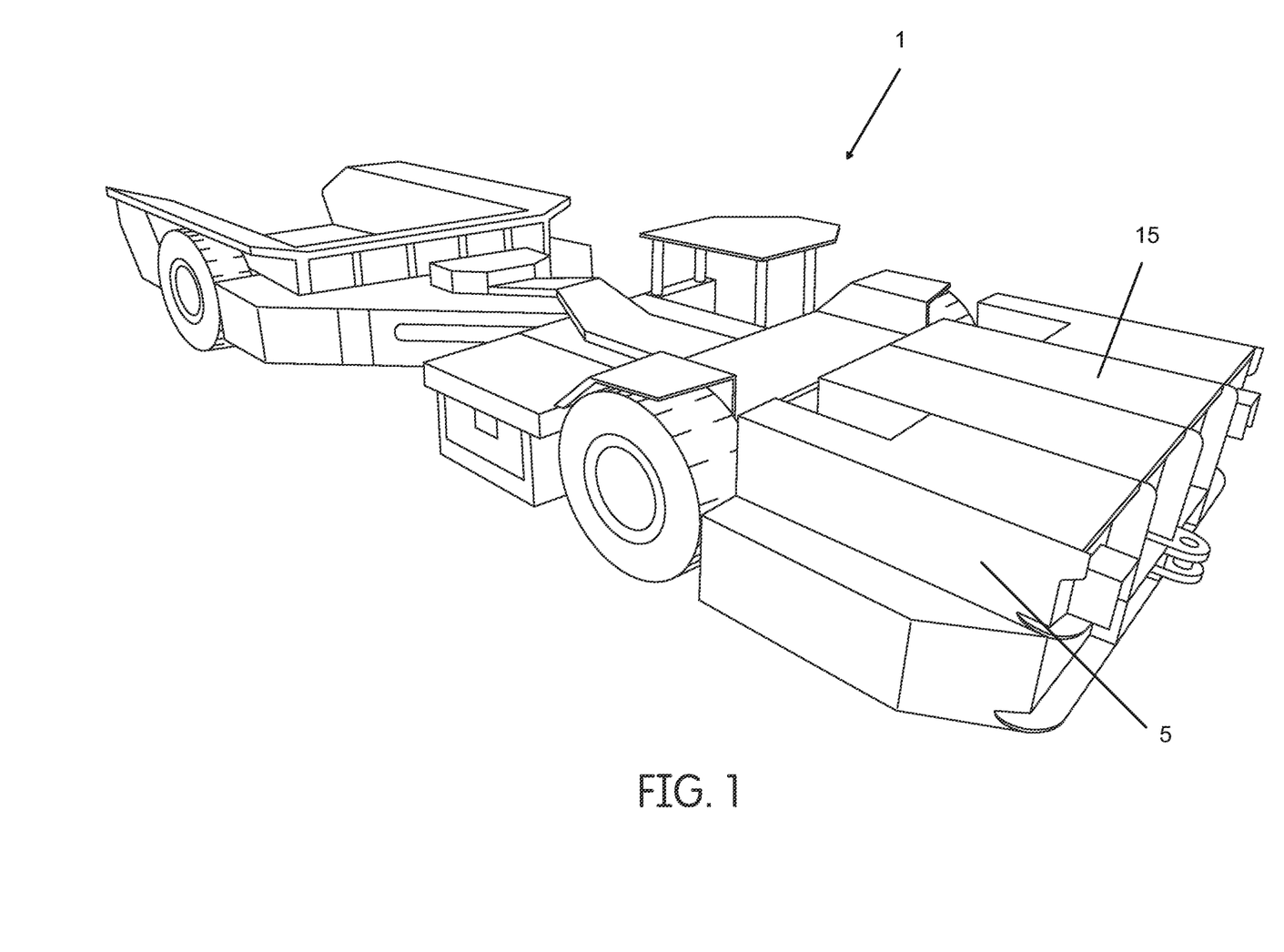
FIG. 1 shows a battery-powered mining hauler including a battery tray and a battery tray cover embodying the invention.
Figure 5:
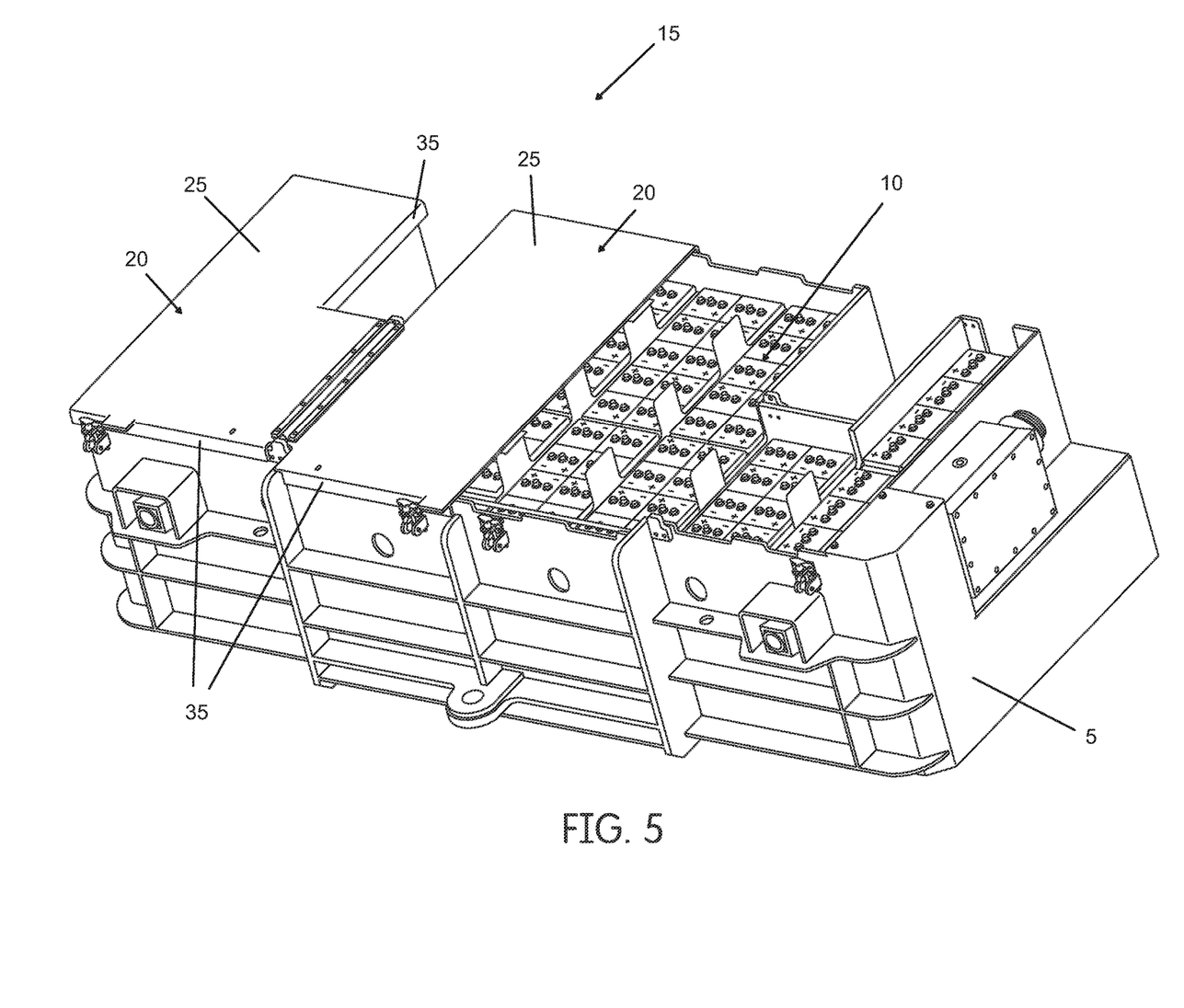
FIG. 5 shows a battery tray with a portion of the battery tray cover partially removed.

FIG. 1 shows a battery-powered mining hauler 1. The battery-powered mining hauler 1 is used to transport mined material in underground mining operations. The battery-powered mining hauler 1 generally comprises a chassis, a battery tray 5, one or more batteries 10 (shown in FIG. 5), and a battery tray cover 15. The chassis of the mining hauler 1 contains the battery tray 5. The battery tray 5 includes sidewalls and an upper edge or lip. As shown in FIG. 5, the batteries 10 are enclosed within the sidewalls of the battery tray 5 and covered by the battery tray cover 15. The batteries 10 provide DC power to the battery-powered mining hauler 1.

Figure 2:
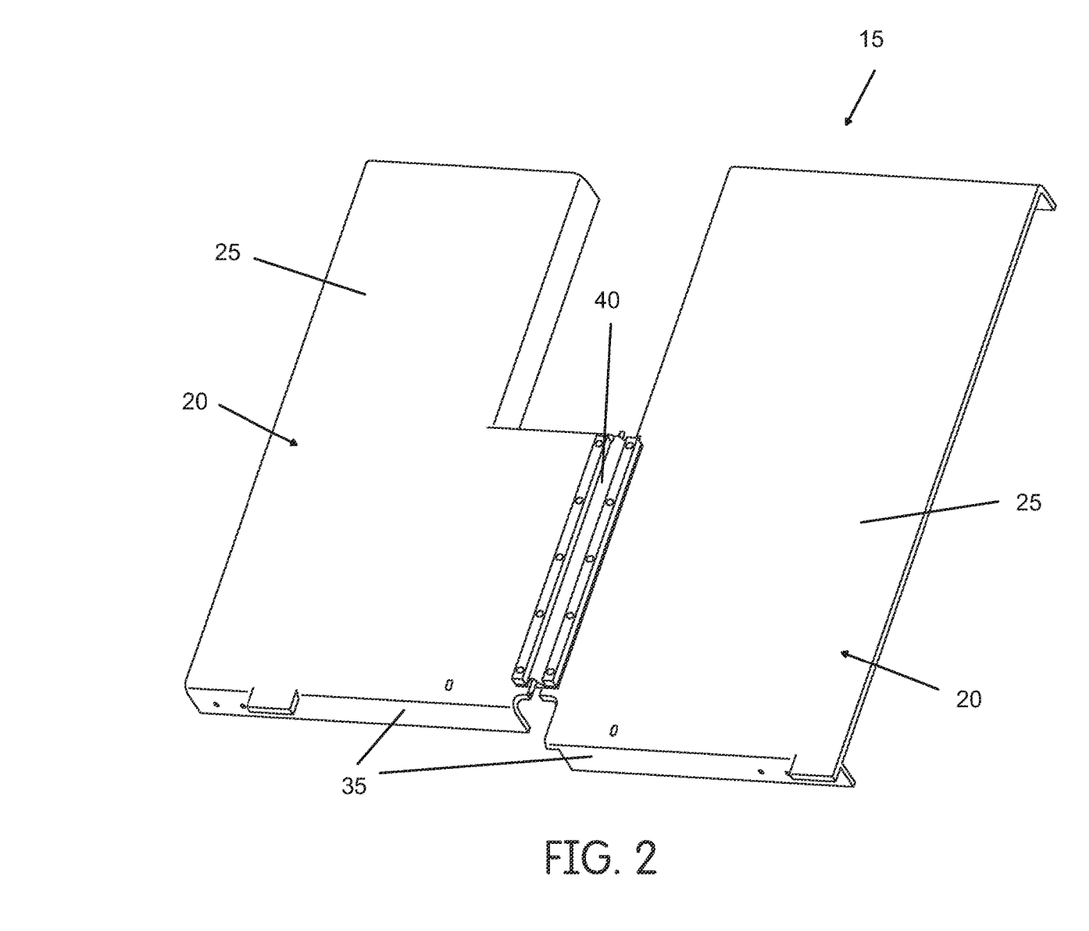
FIG. 2 shows an enlarged view of the battery tray cover, illustrating two battery tray cover panels connected together by a hinge.
Figure 3:
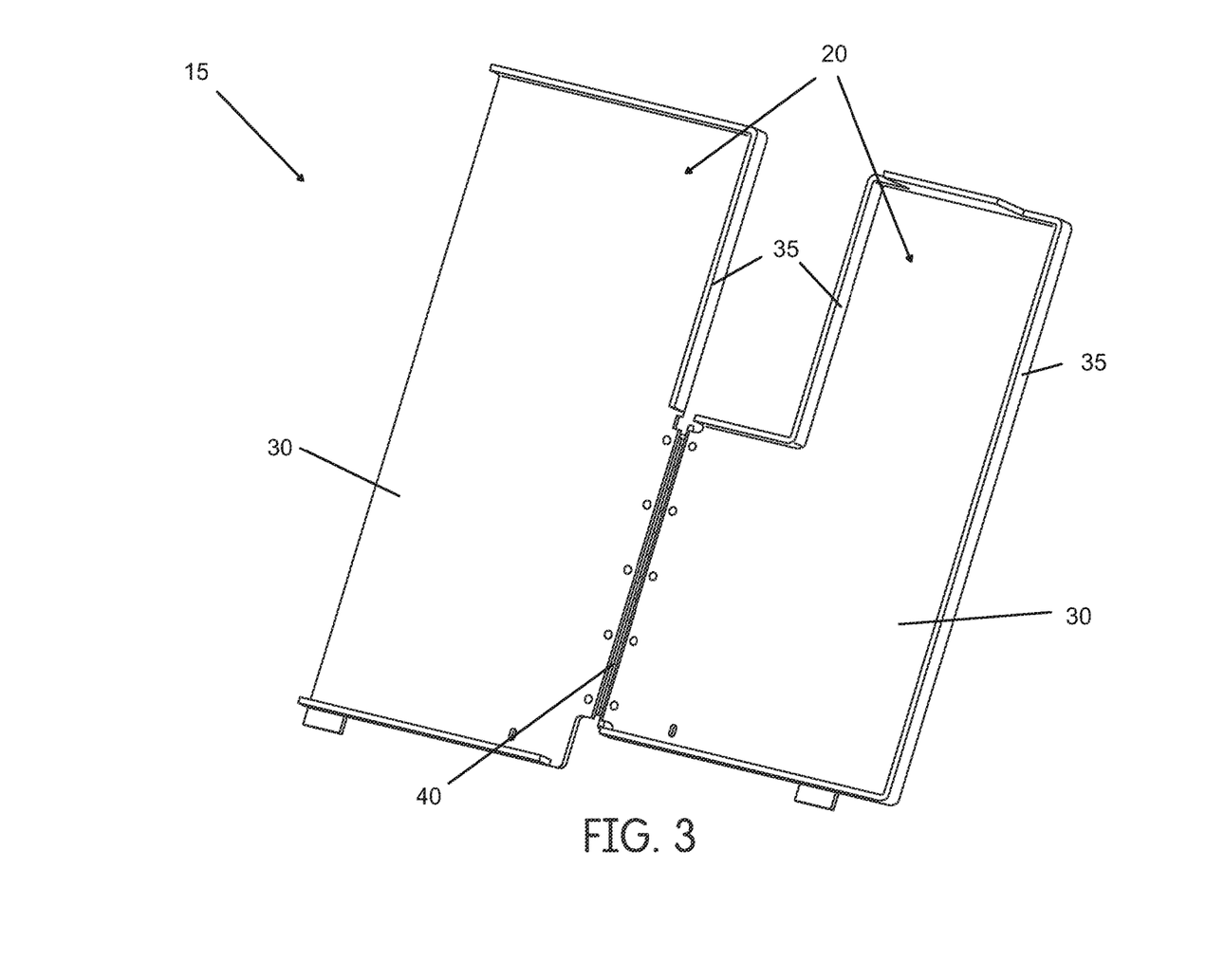
FIG. 3 is a view of the bottom surface of the battery tray cover shown in FIG. 2.

FIGS. 2 and 3 show a battery tray cover 15 in accordance with the present invention. The battery tray cover 15 includes cover panels 20. In one embodiment the cover panels 20 are made of plastic, which may include any of, or any combination of polyurethane, polypropylene, polyethylene, or similar plastic. The cover panels 20 include a top surface 25 and a bottom surface 30. The cover panels define a continuous side surface 35 between the top surface 25 and bottom surface 30.

Figure 4:
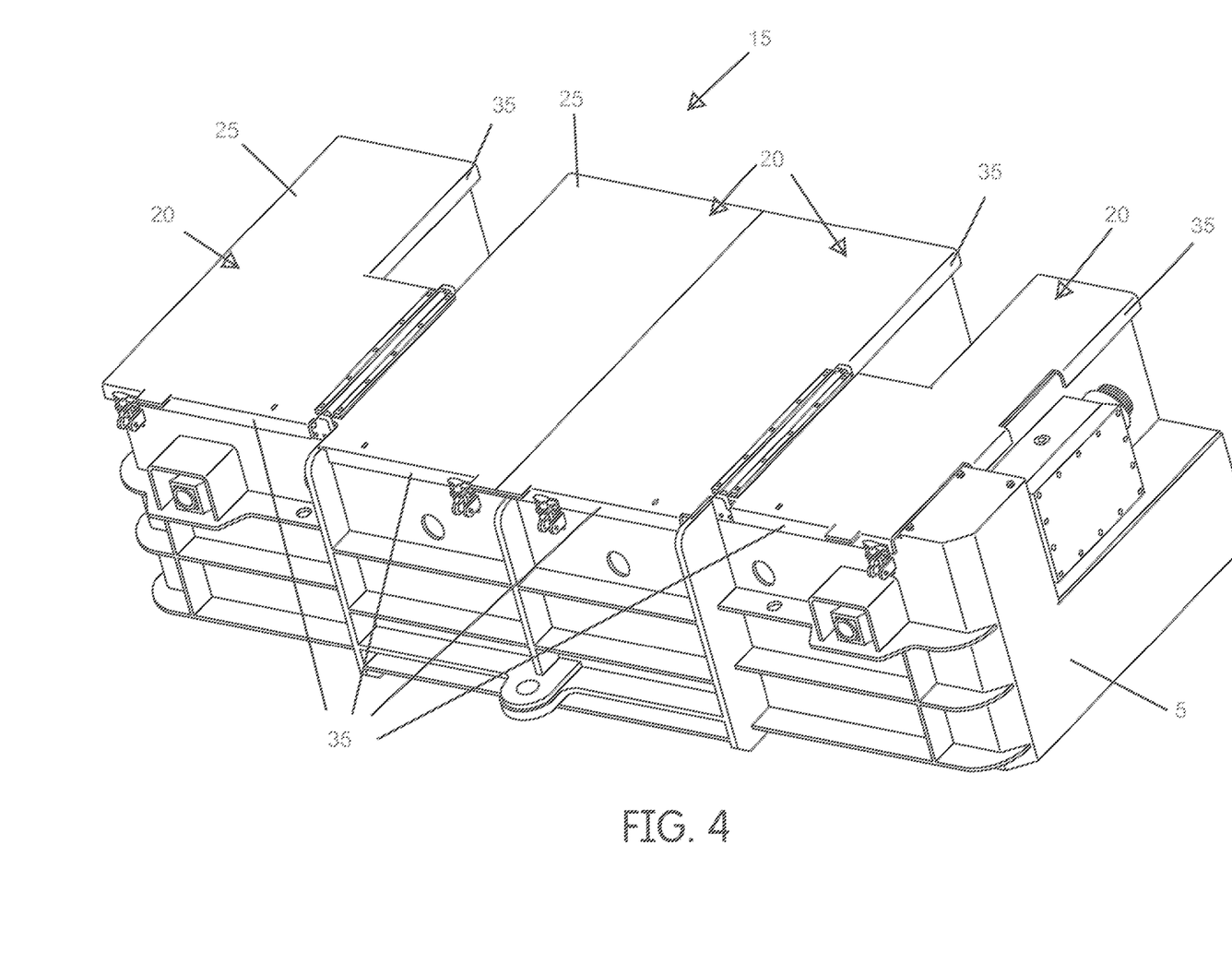
FIG. 4 shows a battery tray and battery tray cover in accordance with the present invention.

As shown in FIGS. 4 and 5 when the battery tray cover 15 covers the battery tray 5, the side surface 35 defines a shroud, or overhang, around the upper lip of the battery tray 5. The side surface 35 also acts as a lift tab to facilitate lifting the cover panels 20.

The cover panels 20 are connected by hinges 40. In one embodiment the hinges 40 are made out of metal. The hinges 40 allow access to compartments of the battery tray 5 without the need to remove the entire battery tray cover 15.

Figure 6:
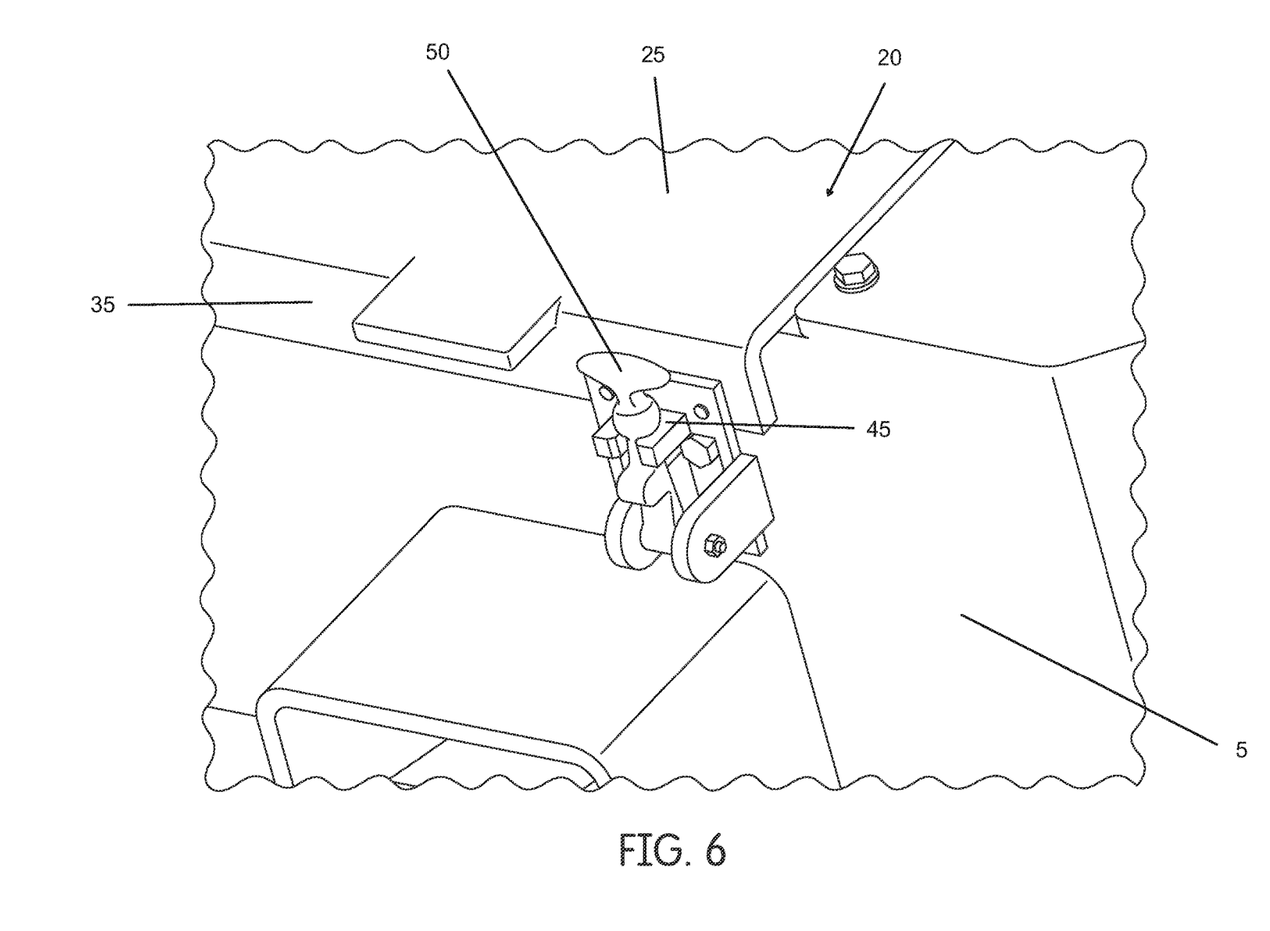
FIG. 6 shows a close-up view of fasteners for securing the battery tray cover to the battery tray.

As shown in FIG. 6, the battery tray cover 15 also has fasteners 45, which attach the battery tray cover 15 to the battery tray 5. In one embodiment, the fasteners 45 are also composed of plastic and are attached to the side surface 35. A rubber hook 50, which is attached to the battery tray 5, is then used to fasten the battery tray cover 15 to the battery tray 5. In another embodiment, the fasteners 45 are composed of metal or similar material.

The cover panels 20 of the battery tray cover 15 can be created using injection molding with plastic. By using plastic, the battery tray cover 15 inherently meets Mine Safety and Health Administration (MSHA) requirements, of being non-conductive, non-flammable, and non-corrosive. Using plastic for the entire battery tray cover 15, rather than just a coating also prevents cracking, peeling, etc. Further, the battery tray cover 15 is light weight, because of the lightweight nature of plastics.

Even though made of plastic, the battery tray cover 15 is as durable as previous metal battery covers. The battery tray cover 15 is able to withstand falling debris, and other elements frequently encountered in underground mining operations.

Figure 7:
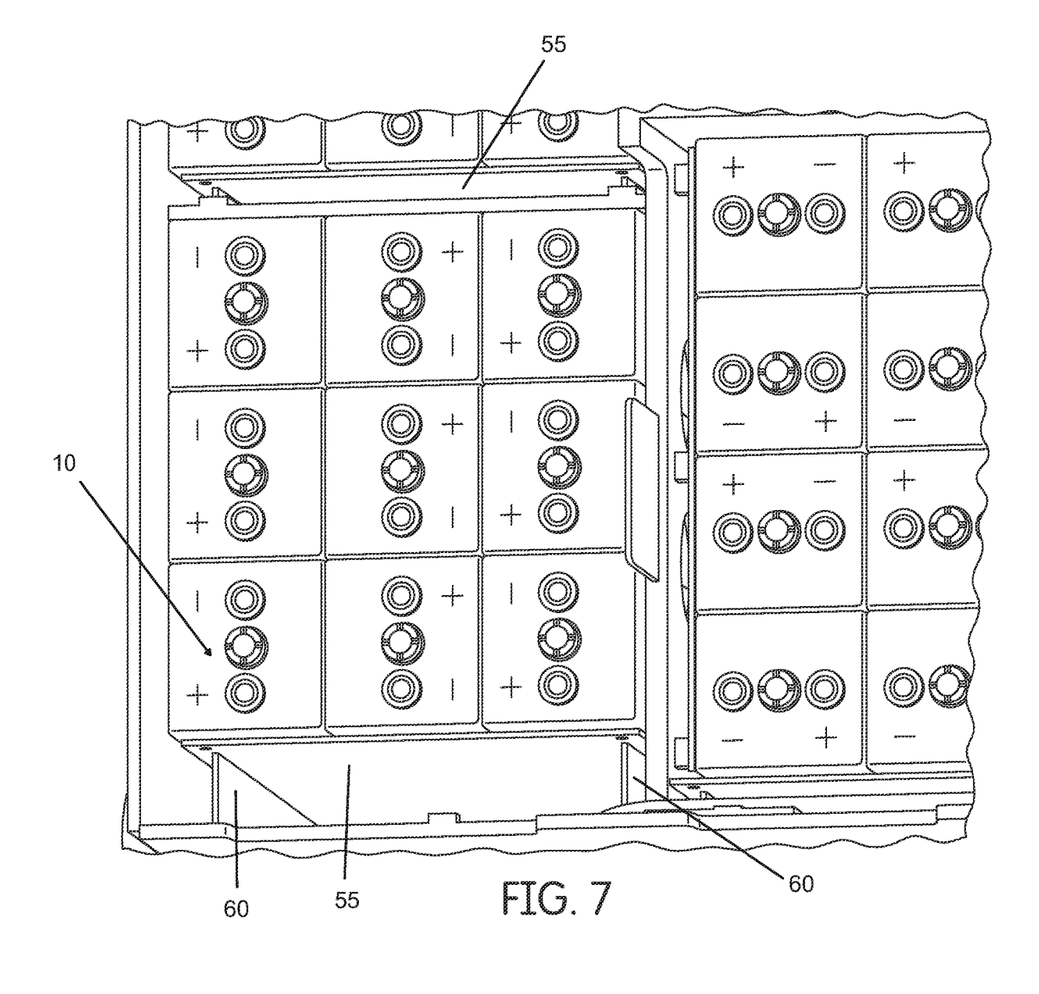
FIG. 7 shows an enlarged view of the battery tray, including one or more battery partitions.
Figure 8:
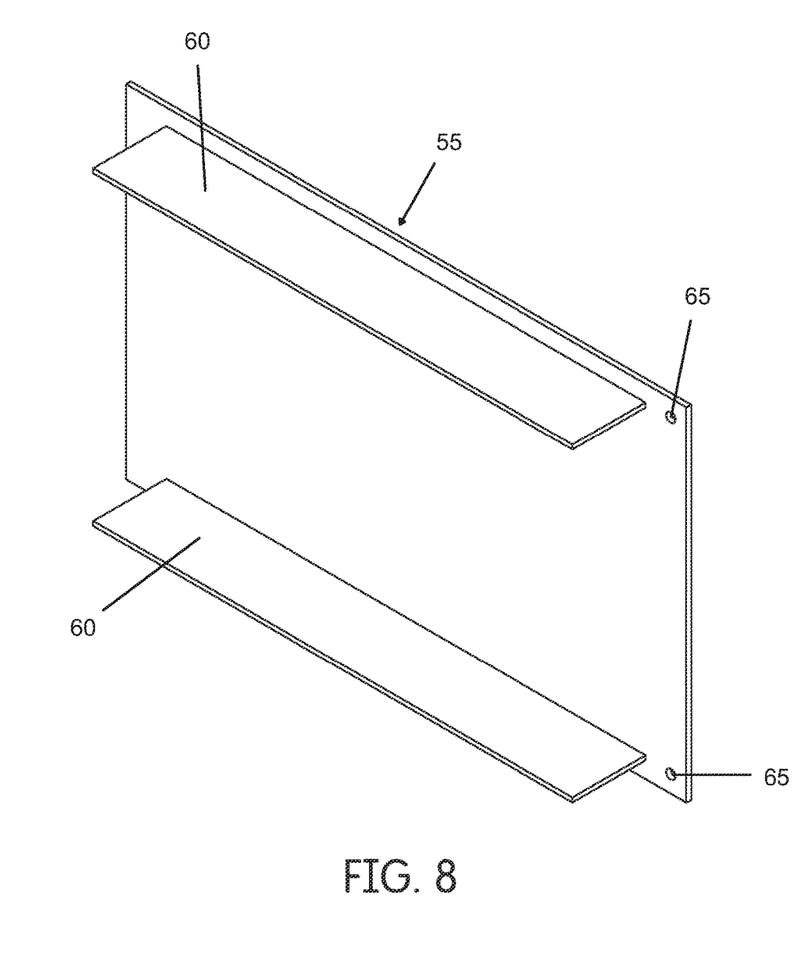
FIG. 8 shows a battery partition of the battery tray.

In another embodiment, shown in FIG. 7, the battery tray 5 further includes battery partitions 55. As shown in FIG. 8, the battery partition 55 includes spacers 60 and apertures 65. The spacers 60 secure the batteries 10 in place within the battery tray 5. The spacers 60 can be of variable lengths, depending on the amount of space which needs to be filled within the battery tray 5. The apertures 65 are used to securely remove the partitions 55 when necessary.

The battery partitions 55, including the spacers 60, can also be created using injection molding with plastic which may include any of, or any combination of polyurethane, polypropylene, polyethylene, or similar plastic. Using plastic for the battery partitions 55, rather than just a coating also prevents cracking, peeling, etc. Further, using plastic for the battery partitions 55 reduces the overall weight of the battery tray 5. In one embodiment, the battery tray 5, including the battery partitions 55, weighs approximately 20,000 lb-22,500 lb when the batteries 10 are placed within the battery tray 5. This results in approximately a 5%-15% reduction in weight when compared to traditional steel battery trays. In a more specific embodiment, the battery tray 5, including the battery partitions 55, weighs approximately 21,000 lb when the batteries 10 are placed within the battery tray 5. This results in approximately a 10% reduction in weight when compared to traditional steel battery trays.

Thus, the invention provides, among other things, a plastic battery cover and plastic battery partitions for underground mining equipment. Various features and advantages of the invention are set forth in the following claims.

What is claimed is:

1. A battery-powered mining machine comprising:
   a battery tray including
   at least one battery partition, the battery partition made entirely of plastic, the at least one battery partition including
   at least one spacer configured to secure a plurality of batteries within the battery tray, and
   at least one aperture to securely remove the at least one battery partition from the battery tray;
   wherein the plurality of batteries in the battery tray are electrically coupled to the mining machine so as to provide power to the mining machine.

2. A battery-powered mining machine as set forth in claim 1, wherein the battery partition is made of plastic, which includes at least one selected from the group consisting of polyurethane, polypropylene, or polyethylene.

3. A battery-powered mining machine as set forth in claim 1, wherein the spacer is made of plastic, which includes at least one selected from the group consisting of polyurethane, polypropylene, or polyethylene.

4. A battery-powered mining machine as set forth in claim 1, further comprising a plastic battery tray cover mounted on the battery tray for enclosing the batteries in the battery tray.

5. A battery-powered mining machine as set forth in claim 1, wherein the battery tray weighs within a range of approximately 4,400 lb.-4,950 lb.

6. A battery tray enclosing one or more batteries electrically coupled to the mining machine so as to provide power to the battery-powered mining machine, the battery tray mounted to a chassis of a battery-powered mining machine, the battery tray comprising:
   at least one battery partition made entirely of plastic, the battery partition including
   at least one spacer configured to secure the one or more batteries within the battery tray, and
   at least one aperture to securely remove the at least one battery partition from the battery tray.

7. A battery tray as set forth in claim 6, wherein the battery partition is made of plastic, which includes at least one selected from the group consisting of polyurethane, polypropylene, or polyethylene.

8. A battery tray as set forth in claim 6, further comprising a plastic battery tray cover mounted on the battery tray for enclosing the batteries in the battery tray.

9. A battery tray as set forth in claim 6, wherein the battery tray weighs within a range of approximately 4,400 lb.-4,950 lb.

10. A battery-powered mining machine comprising:
    a chassis; and
    a battery tray mounted to the chassis, the battery tray including at least one battery partition, the battery partition made entirely of plastic, the battery partition including
    at least one spacer configured to secure a plurality of batteries within the battery tray,
    at least one aperture to securely remove the battery partition from the battery tray;
    wherein the plurality of batteries are electrically coupled to the battery-powered mining machine so as to provide power to the mining machine.

11. A battery-powered mining machine as set forth in claim 10, wherein the battery partition is made of plastic, which includes at least one selected from the group consisting of polyurethane, polypropylene, or polyethylene.

12. A battery-powered mining machine as set forth in claim 10, wherein the spacer is made of plastic, which may include any of, or any combination of polyurethane, polypropylene, or polyethylene.

13. A battery-powered mining machine as set forth in claim 10, further comprising a plastic battery tray cover mounted on the battery tray for enclosing the batteries in the battery tray.

14. A battery-powered mining machine as set forth in claim 10, wherein the battery tray weighs within a range of approximately 4,400 lb-4,950 lb.

\* \* \* \* \*